United States Patent [19]

Walsh

[11] Patent Number: 4,713,152

[45] Date of Patent: Dec. 15, 1987

[54] METHOD AND SYSTEM FOR THE REMOVAL OF OXIDES OF NITROGEN AND SULFUR FROM COMBUSTION PROCESSES

[75] Inventor: John V. Walsh, Glendora, Calif.

[73] Assignee: VSM Associates, Inc., Covina, Calif.

[21] Appl. No.: 23,724

[22] Filed: Mar. 9, 1987

[51] Int. Cl.⁴ .................................................. C25F 5/00
[52] U.S. Cl. ...................................... 204/130; 204/410; 204/421
[58] Field of Search .................... 204/130, 421, 410

[56] References Cited

U.S. PATENT DOCUMENTS 3,347,767  5/1987  Hickam ............................. 204/410

Primary Examiner—R. L. Andrews

Attorney, Agent, or Firm—William W. Haefliger

[57] ABSTRACT

A process for removing oxide contaminants from combustion gas, and employing a solid electrolyte reactor, includes:

(a) flowing the combustion gas into a zone containing a solid electrolyte and applying a voltage and at elevated temperature to thereby separate oxygen via the solid electrolyte, (b) removing oxygen from that zone in a first stream and removing hot effluent gas from that zone in a second stream, the effluent gas containing contaminant, (c) and pre-heating the combustion gas flowing to that zone by passing it in heat exchange relation with the hot effluent gas.

26 Claims, 10 Drawing Figures

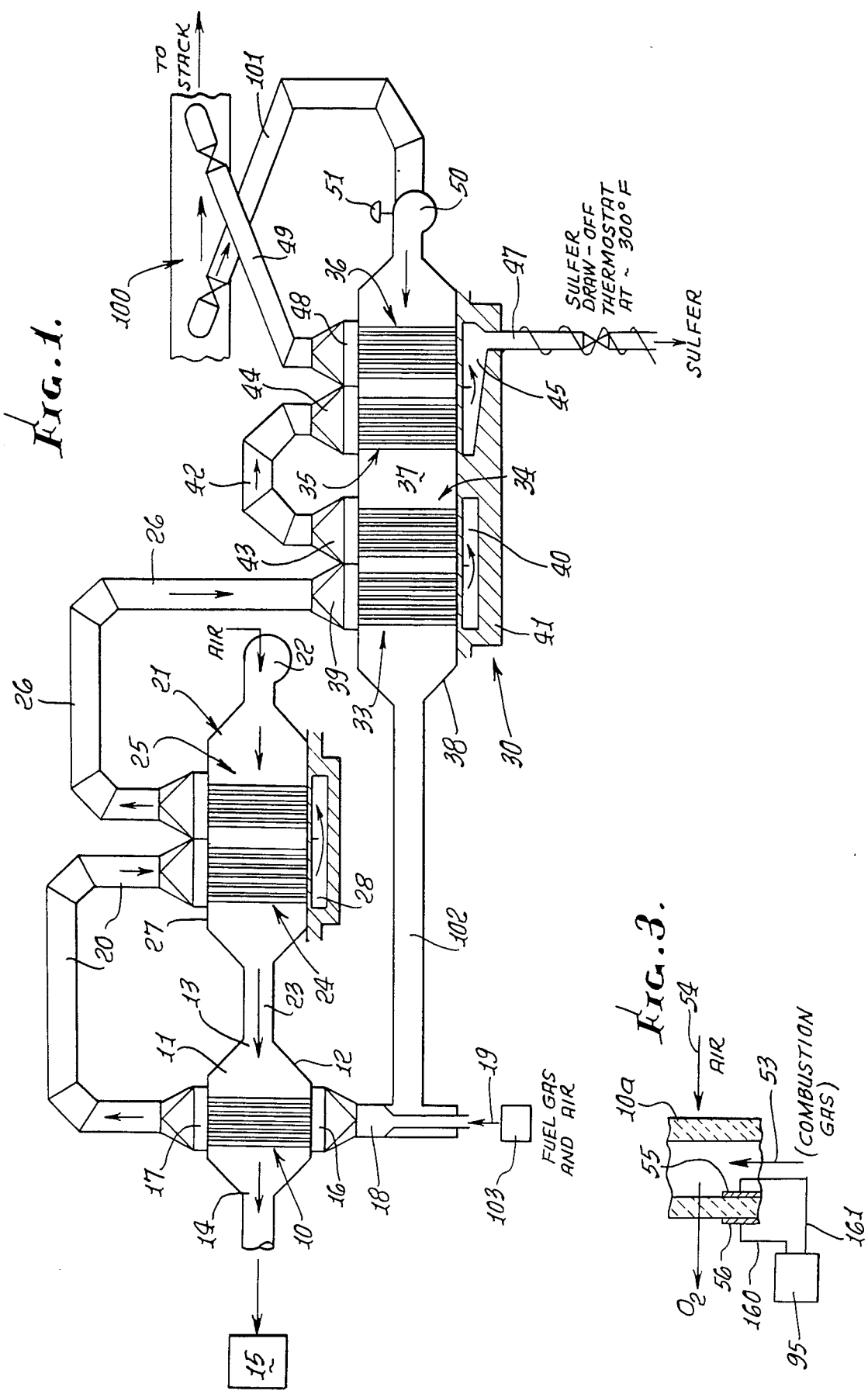

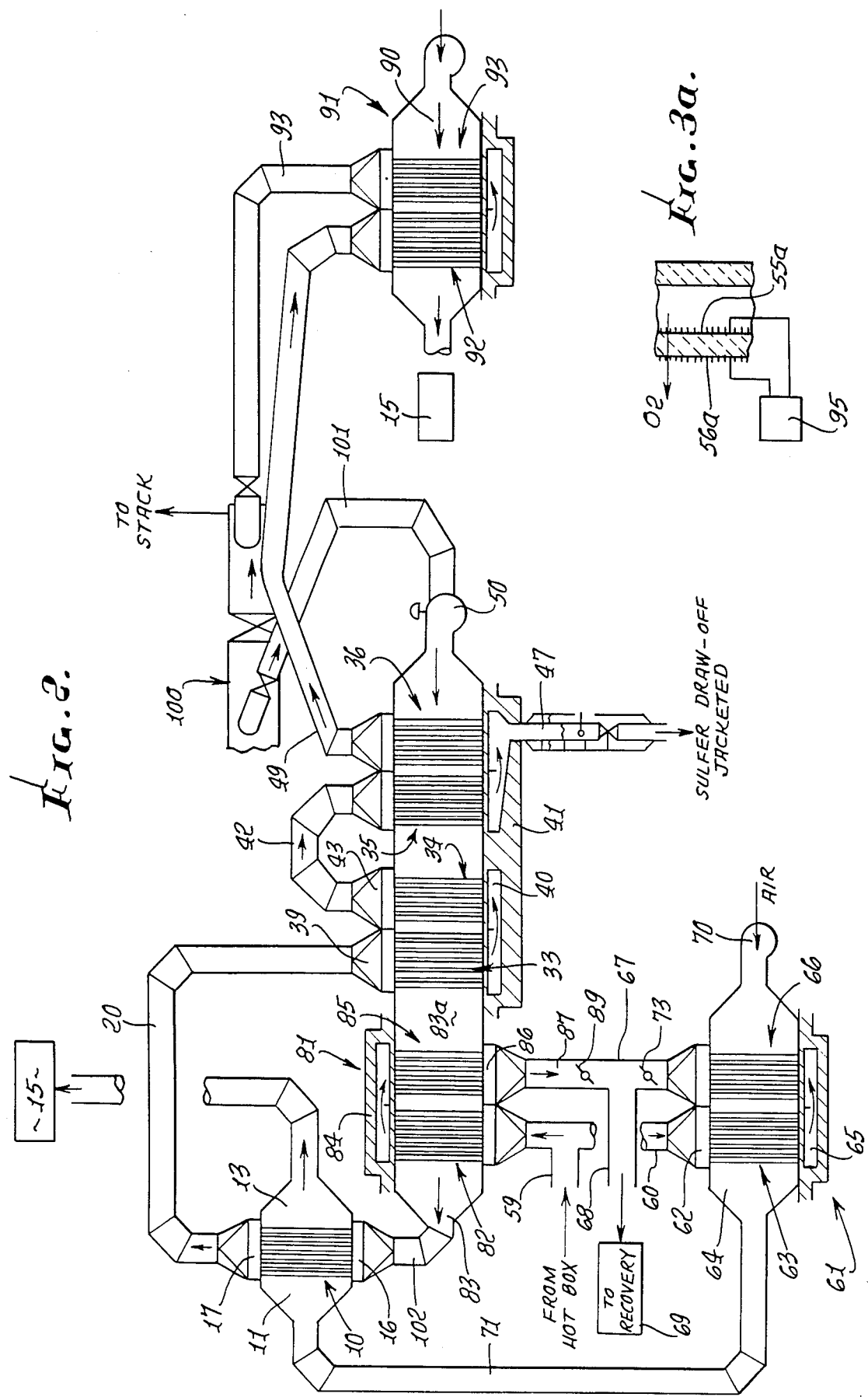

COMPARISON OF NO2 DISSOCIATION FOR PURGED AND NON-PURGED ZIRCONIA CELL

O2 DISSOCIATION

CO2 DISSOCIATION

VISCOSCITY OF LIQUID SULPHER. HIGH TEMPERATURE RANGE.

METHOD AND SYSTEM FOR THE REMOVAL OF OXIDES OF NITROGEN AND SULFUR FROM COMBUSTION PROCESSES

BACKGROUND OF THE INVENTION

This invention relates generally to removal of oxides of nitrogen and of sulfur from combustion processes; more particulary, it concerns unique and highly efficient apparatus to secure such contaminant removal.

Sulfur oxides (SOx) and nitrogent oxide (NOx) are the two most important atmospheric pollutants in the United States. About 75 percent of the SOx emissions in this country come from stationary combustion sources, primarily utility and industrial boilers. The remaining 25 percent comes from smelting copper, lead, and zinc sulfide ores, and from other industrial processes. About 98 percent of the SOx emissions are due to $SO_2$ with the remaining 2 percent due primarily to $SO_3$. NOx emissions are produced by all combusion processes that use air as the source of oxygen, even methane burners.

The primary source of SOx emissions are sulfur-bearing coals which range from about 0.3 to 8.0 percent sulfur by weight in the United States. This sulfur comes in either pyritic or organic form, and can be separated from coal by various physical means, especially water washing. However, organic sulfur is chemically linked to coal, and chemical means are required for its removal.

Most commercial installations currently use wet, nonregenerative lime/limestone flue gas desulfurization (FGD) procedures. These procedures produce calcium sulfite or calcium sulfate sludges which require disposal. Typically about 85 percent of the $SO_2$ and 99 percent of the particulates are removed by FGD. In non-regenerative scrubbing processes, solids disposal is a major problem. The mass of solids per unit mass of sulfur removed ranges from 4.0 to 6.6. Therefore, the large solids-waste handling and disposal problem has encouraged and made necessary efforts to develop alternative procedures for the removal of $SO_2$.

Nearly every combustion process that uses air as the source of oxygen produces NOx pollutants. At high temperatures, the atmospheric nitrogen combines with oxygen to form NOx compounds. Nox is most commonly emitted as either NO or $NO_2$, the NO being readily oxidized in the atmosphere to $NO_2$.

The most common NOx emission control strategy in the United States is to modify the combustion process to limit the flame temperature, low temperature inhibiting the rate of formation of NOx compounds. SOx scrubbers also remove some of the NOx emissions. Selective catalytic reduction (SCR) has been widely used in Japan for NOx reduction, mostly on oil-fired boilers, but on some coal-fired boilers as well. System suppliers routinely design and guarantee the SCR reactor for 80 percent NOx removal. SCR technology is not solely relied on for NOx reduction, but is usually combined with combustion modifications.

There is need for improved systems and methods to overcome problems and difficulties with the above techniques, including problems with solids disposal, solids waste-handling, and re-heat steps required with existing wet scrubbing FGB systems. Also, there is need for apparatus and process according to the present invention wherein SOx and NOx are removed from combustion gas streams, and essentially pure sulfur pure nitrogen is released to atmosphere.

SUMMARY OF THE INVENTION

It is a major object of the invention to provide an improved process for removing oxide contaminants form combustion gas by employing solid electrolyte reactor means. The basic steps of the process include (a) flowing the combustion gas into a zone containing the solid electrolyte means and applying a voltage to said means and at elevated temperature to thereby separate oxygen via the solid electrolyte means, (b) removing oxygen from said zone in a first stream, and removing hot effluent gas from said zone in a second stream, the contaminant having been removed from the effluent gas, (c) and pre-heating the combustion gas flowing to said zone by passing it in heat exchange relation with the hot effluent gas.

Typically, removal of oxygen from the solid electrolyte zone includes flowing air to that zone to mix with the oxygen to lower the partial pressure of oxygen at that zone, and form the first stream. Such air may be pre-heated, such pre-heating typically carried out by passing it in heat exchange relation with the hot effluent gas; or, such pre-heating may be carried out by passing the air in heat exchange relation with the combustion gas.

Further, the contaminants typically include $SO_2$ which dissociates in said zone, with S carried form that zone in the effluent second stream; and S may be removed from the second stream as the latter second stream passes in heat exchange relation with the combustion gas flowing to said zone. Also, the contaminants typically include $NO_2$, both S (existing as $S_2$, $S_4$, $S_6$, or various other forms) and $N_2$ forming in said zone, and S may be removed from said second stream, $N_2$ being carried in gaseous state in the second stream to discharge to atmosphere.

Additional steps include controllably combusting fuel gas and air, and mixing the combustion products thereof with the combustion gas flowing to said zone to control the reaction temperature at the reaction zone to optimize $O_2$ separation; controllably heating the combustion gas flowing to said zone, for the same purpose; employing the first stream that includes $O_2$ and air in the combustion of fuel that forms the combustion gas; employing a solid electrolyte in the form of a zirconia tube having a wall penetrated by oxygen ions dissociated from contaminant ions; and employing "wooly" electrodes on the electrolyte to optimize $O_2$ separation.

These and other objects and advantages of the invention, as well as the details of an illustrative embodiment, will be more fully understood from the following specification and drawings, in which:

DRAWING DESCRIPTION

FIG. 1 is a diagrammatic view of one form of apparatus performing the process of the invention;

FIG. 2 is a diagrammatic view of a second form of apparatus performing the process of the invention;

FIG. 3 is a section taken through a cell employed in the FIGS. 1 and 2 apparatus;

FIG. 3a is a modification; and

DETAILED DESCRIPTION

Figure 4:
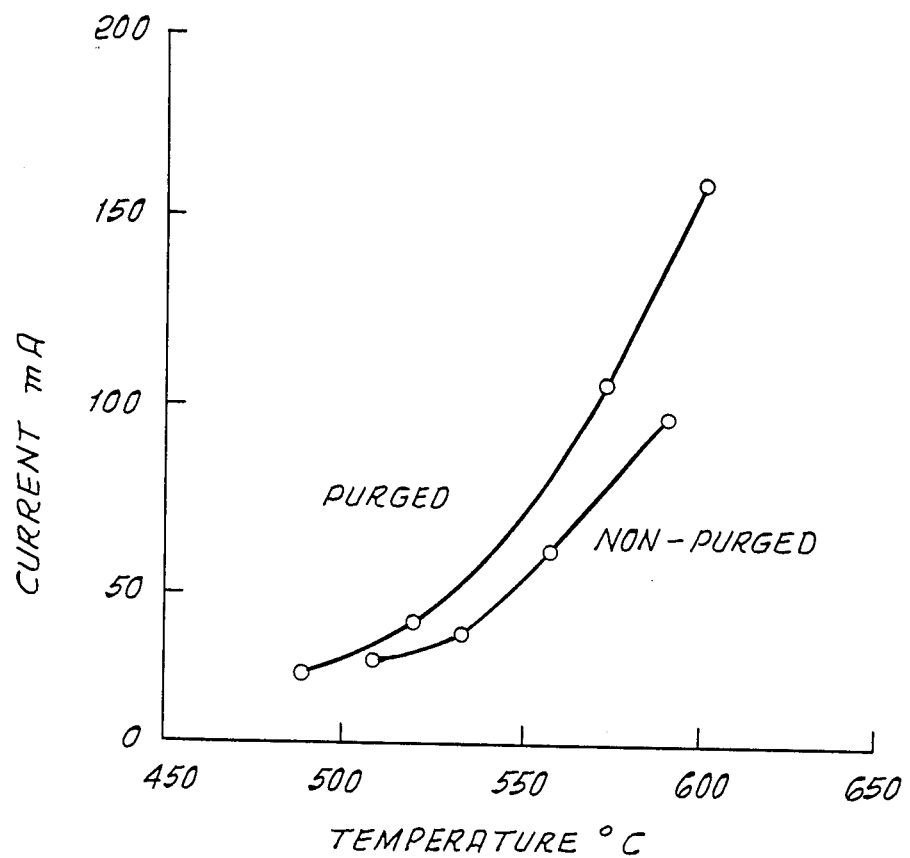
FIGS. 4–9 are graphs.
Figure 5:
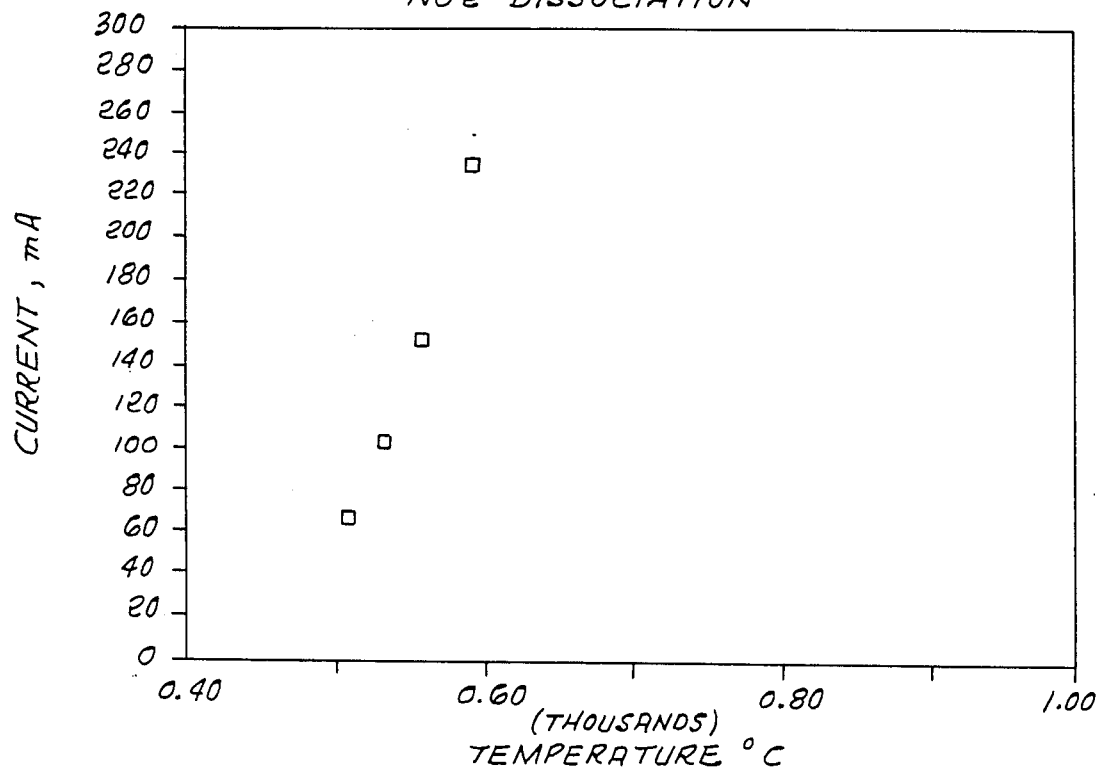
Figure 6:
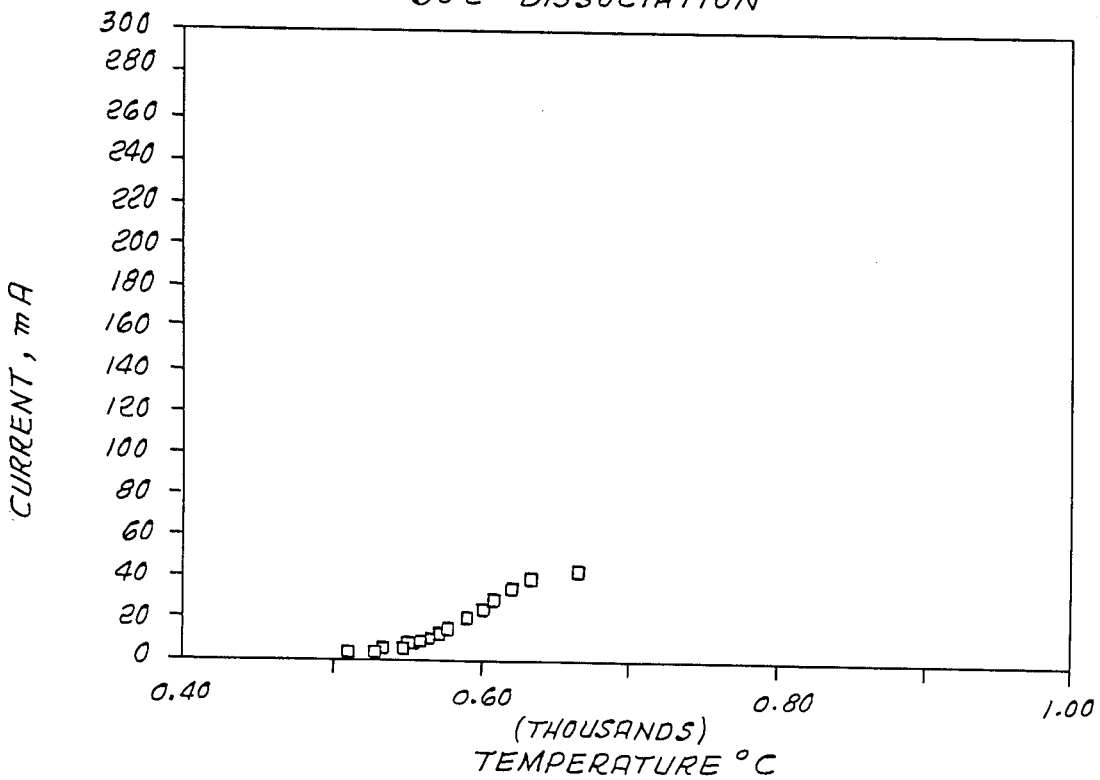
Figure 7:
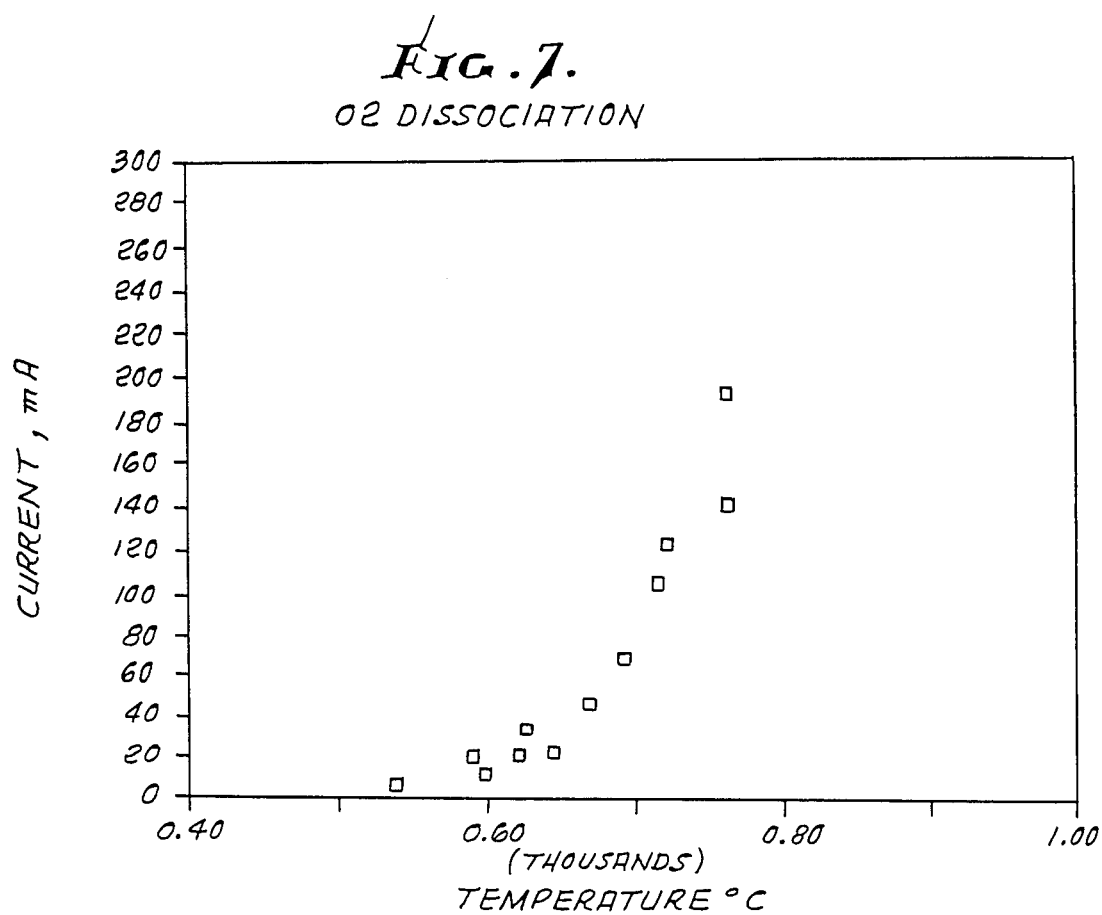
Figure 8:
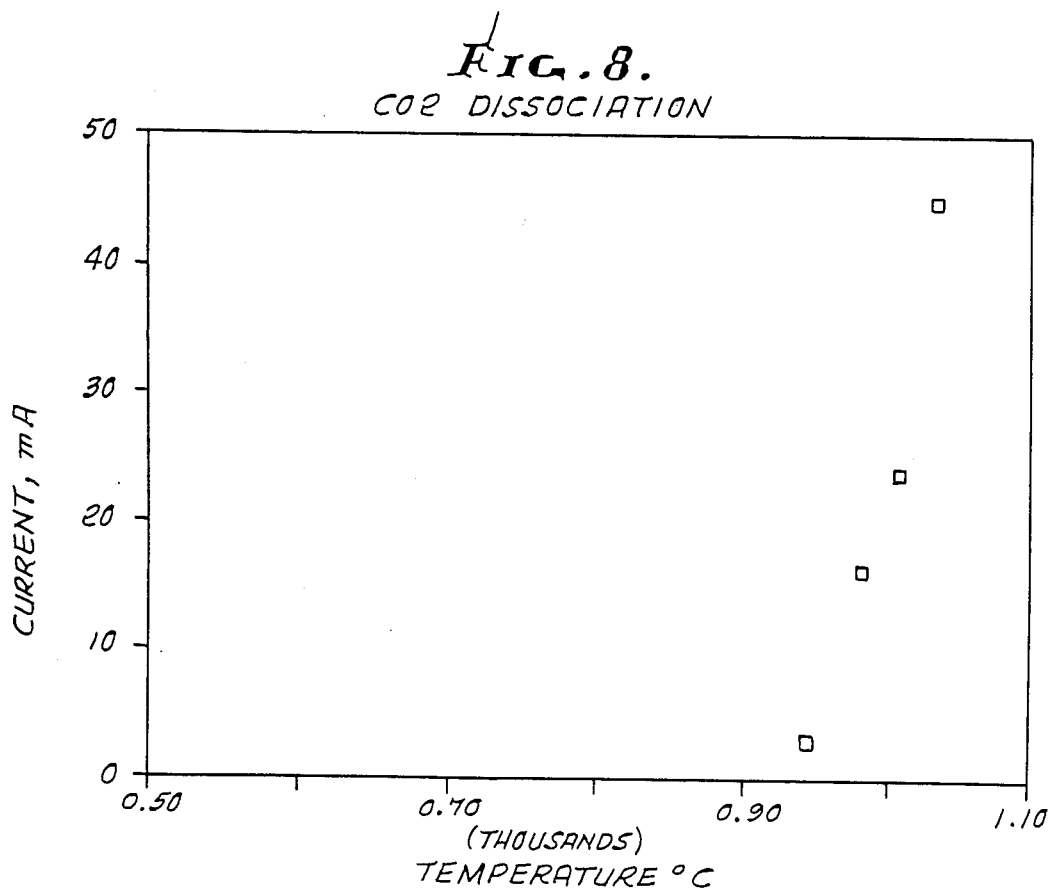
Figure 9:
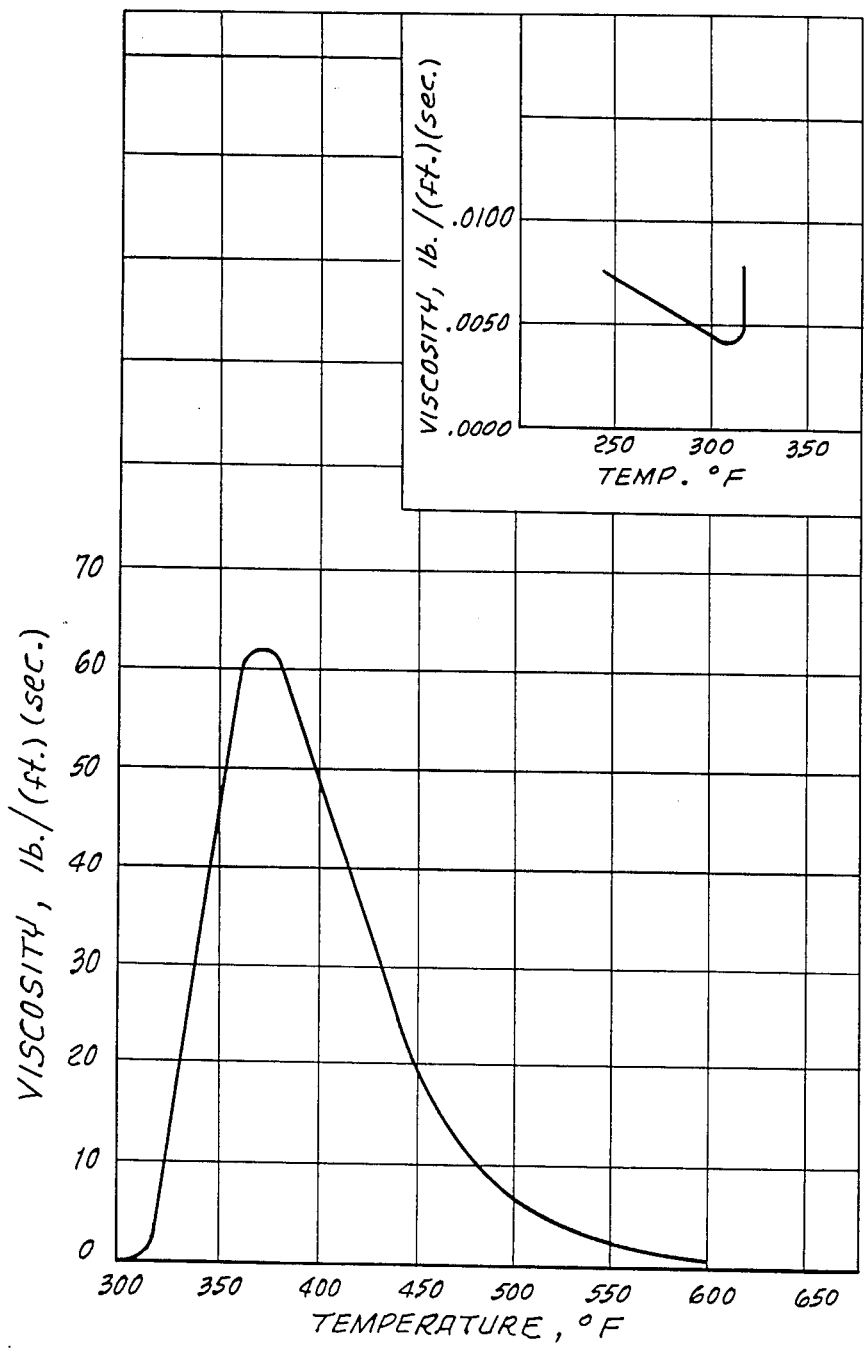

Referring first to FIG. 1, solid electrolyte reactor cell means 10 typically includes multiple zirconium tubes 10a better seen in FIG. 3. The cell means are located within a zone 11 defined by a housing 12. Air is passed through zone 11, via inlet 13 and outlet 14, to remove oxygen from zone 11 in a first stream indicated as passing to the combustion process fire box 15.

Combustion gas is supplied to the cell means 10 as via a header 16, and leaves zone 11 via a header 17. The combustion gas may be supplied from flue duct 100, as via ducting indicated at 101 and 102. Also the flue gas may pass through a burner 18 to which fuel gas and air are supplied at 19 for burning and mixing with the flue gas to heat same, and control its temperature at the inlet to the cell means. Note fuel gas control 103. The cell means 10 which thus operates at controlled elevated temperature separates oxygen via the solid electrolyte in the cell, and to which voltage is applied, oxygen ions passing through the solid electrolyte and forming $O_2$ removed by air passing through zone 11 as described.

Hot effluent gas is removed from the cell means 10 via header 17 in a second stream, the effluent gas containing contaminant such as S and $N_2$. It is typically circulated via ducting 20 to heat exchanger generally indicated at 21. Air supplied via a fan 22 passes through the exchanger 21 and is heated for supply at 23 to zone 11 as described, whereby the partial pressure of $O_2$ at that zone is lowered, for higher process efficiency. Exchanger 21 is shown to include exchanger tubes in first and second groups or banks 24 and 25, connected in series, as shown, to pass hot effluent gas from ducting 20 to ducting 26. Tubing banks 24 and 25 are located within the exchanger housing 27, and gas passes from parallel tubes in bank 24 to parallel tubes in bank 25 via a transfer passage 28.

The hot second stream in duct 26 containing S and $N_2$ and at about 200° C., is then passes in heat exchange relation, as at heat exchanger 30, with combustion gas flowing via ducts 101 and 102 to the cell means, as referred to, whereby the combustion gas is pre-heated for process efficiency. The exchanger 30 typically includes series connected first and second banks 33 and 34 of tubes, and series connected third and fourth banks 35 and 36 of tubes, externally exposed in combustion gas flow passage 37 within housing 38. The exchanger may alternatively be of plate type, or consist of more than two banks of tubes. Second stream gas from duct 26 enters the tubes in bank 33 via header 39 at one side of housing 38, and passes from bank 33 to bank 34 via a transfer passage 40 in support structure 41 at the underside of housing 38. The second stream gas then flows from tube bank 34 to duct 42 via header 43, and to tube bank 35 via header 44. Second stream gas flows from tube bank 35 to tube bank 36 via transfer passage 45 in structure 41, from which sulfur is drawn off via duct 47 at elevated temperature, as for example about 150° C. The gas entering the tube bank 36 exits same via header 48 and returns via duct 49 to the flue 100. Thus, effluent is passed to atmosphere.

The flow rate of combustion gas through the heat exchanger over the tubes in the banks 33–36 is regulated by a blower at location 50, controlled at 51.

The enlarged view FIG. 3 shows one of the parallel tubes 10a in the reactor cell means 10, with combustion gas flowing through the tube as indicated by arrow 53, and air flowing over the tube as indicated by arrow 54.

The tube may consist of zirconia, and a voltage differential V is applied across the tube wall thickness as by electrodes 55 and 56 on the tube bore 57 and outer surface 58. Such electrodes may for example consist of platinum, and a voltage source is indicated at 95 connected via leads 60 and 61 with the electrodes. The latter may consist of other conductors.

In 1899, Nernst found that oxygen could pass through stabilized zirconia, a solid electrolyte, by the process of ion conduction. The potential difference across an ion-conducting solid electrolyte caused by the difference in the partial pressures of oxygen on the two sides is given by $$E = (RT/ZF)\ln(P_2/P_1) \quad (1)$$

where
 $E$ = electric potential, volts
 $R$ = universal gas constant, 8.314398 J/mole-K
 $T$ = temperature, K
 $Z$ = charges/molecule ($Z=4$ for $O_2$)
 $F$ = Faraday constant, $9.648679 \times 10^4$ amp sec/equiv. mole
 $P_1$ = partial pressure of oxygen on the supply side of the solid electrolyte, $N/m^2$ (Pascal)
 $P_2$ = partial pressure of oxygen on the discharge side of the solid electrolyte, $N/m^2$ (Pascal)

A voltage applied across zirconia results in electrical conduction by ions which are formed on the cathode according to the reaction $$O_2 + 4e^- \rightarrow 2O^= \quad (2)$$

with recombination at the anode $$2O^= \rightarrow O_2 + 4e^- \quad (3)$$

Zirconia behaves much like a semi-conductor, except that conduction takes place by means of oxygen ions rather than by electrons.

In order to use the zirconia electrolyte to separate oxygen from a combustion gas, or other oxygen-containing gas, an additional voltage in excess of that specified by the Nernst equation is required, owing to the resistance of the solid electrolyte. Thus the voltage, V, required to pump oxygen through the solid electrolyte is $$V = IR - E \quad (4)$$

where
 $I$ = current, amp
 $R$ = solid electrolyte resistance, ohms
 $E$ = electric potential from the Nernst equation The current, I, is given by $$I = J_t A \quad (5)$$

where
 $J_t$ = total (ionic and electronic) current density, amp/$cm^2$
 $A$ = surface area, $cm^2$
and the electrolyte resistance, R, is $$R = \rho_e l / A \quad (6)$$

where
 $e$ = electrolyte resistivity, ohm-cm l=electrolyte thickness, cm

Thus, substitution of Eqs. (1), (5), and (6) into Eq. (4) gives $$V = J_t \rho_e l - (RT/ZF) \ln(P_2/P_1) \qquad (7)$$

which is the voltage required to pump oxygen through the solid electrolyte. The first term on the right-hand side of Eq. (7) represents the ohmic voltage across a zirconia electrolyte. A typical value is 2.0 volts compared to a Nernst voltage of 0.026 volts for an oxygen partial pressure difference of 5 psi. In most solid electrolyte oxygen pump applications, the Nernst voltage will be negligible in comparison to the ohmic voltage.

The zirconia unit acts as a chemical reactor. The reaction process is one of decomposition of the oxides of sulfur and nitrogen followed by removal of the free oxygen. The performance of a continuous flow chemical reactor is generally specified in terms of conversion and space time. Conversion measures the ratio of exiting products to entering reactants. In the current study, conversion means the percent of sulfur or nitrogen oxides removed.

Space time is a measure of residence time in the reactor, and is expressed in units of time. The longer the space time the more conversion takes place. On the other hand, higher conversion for a given space time means a more efficient reaction process. The space time is used to scale-up reactor test results from laboratory reactors to full scale commercial reactors. The dissociation of $SO_2$ is given by the reaction:

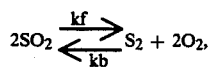

where
kf is the forward reaction rate constant and kb is the reverse reaction constant. The equilibrium constant, K, is the ratio of the two rate constants. In a closed system, where the removal of the reaction constituents is prevented, the reverse reaction proceeds much faster than the forward reaction. As a result the equilibrium concentration of $S_2$ and $O_2$ is very low. In the proposed system the presence of the solid zirconia membrane allows the oxygen to be removed, the back reaction is inhibited, and the decomposition of $SO_2$ proceeds at an acceptable rate. The forward reaction rate has an Arrhenius form $$k_f = A\, e^{-E/RT}$$

where
$k_f$=reaction rate, cm$^3$/mole-sec
R=universal gas constant, 1.987 cal/mol K
T=temperature, K
A=reaction constant, cm$^3$/mole-sec
E=activation energy, cal/mol This reaction rate equation shows that as the cell operating temperature goes up, the forward reaction rate also goes up. When the cell temperature is above 650° C. the reaction rate is sufficient to allow removal of the SOx-NOx compounds in a reasonably sized unit.

The oxygen can be removed from the system by conducting it through the zirconia electrolyte. The voltage required is equal to the Nernst voltage plus the IR voltage to overcome the zirconia resistance.

Turning to FIG. 2, the modified apparatus shown includes certain components which are the same as in FIG. 1, and therefore bearing the same identifying numerals.

Pre-heating of air flowing to zone 11 is here carried out by flowing it in heat exchange relation with hot combustion gas from the combustion firebox 15. See for example the supply of hot combustion gas at 59 for flow via duct 60 to heat exchanger 61 in the form of a purge heater. Hot gas flows via header 62 into tube bank 63 in zone 64, then via transfer passage 65 to tube bank 66, and then to ducts 67 and 68 for flow to external heat recovery system indicated at 69. Gas supplied at 59 may for example be at about 2000° F., and leaving at 68 may be at about 1400° F. Air supplied to zone 64 as by fan 70 is heated therein and passed via ducting 71 to zone 11 to remove $O_2$ and deliver same to firebox 15. Controllable damper 73 in duct 67 controls the flow of firebox gas to exchanger 61, thereby to control the heating of the air flowing to zone 11, to assist in controlling the reaction temperature in that zone.

In addition, the combustion gas flowing to zone 11 may be further and controllably heated by passing it in heat exchange relation with hot gas from the firebox, for greater efficiency, and for control of temperature in the reaction zone 11. See for example the exchanger 81 having tube bank 82 in duct 83 (in series with duct 102) receiving hot firebox gas via supply inlet 59 and heater 84; tube bank 85 in passage 83a receiving hot gas form tube bank 82 and passage 83; the exit gas flowing via header 86 and duct 87 to outlet 68. A controllable damper 89 in duct 87 controls the flow of hot firebox gas to exchanger 81, thereby to control heating of combustion gas flowing in passage 83 and duct 102 to the reactor tubes zone 11, to assist in controlling the $O_2$ dissociation temperature in that zone.

Cell effluent at 49 is shown as employed to heat air flowing at 90 in exchange (air preheater) 91, via tube banks 92 and 93, the effluent flowing at 93 (at about 200° C. to stack). Heated air flow 90 passes to firebox 15.

FIG. 4 shows that using flue gas to purge oxygen from the cell in zone 11 can improve the efficiency by up to 50%. In the cell, the zirconia tube surface area available for oxygen transport can be increased, for improving oxygen yield. For this purpose, and instead of using platinum electrodes (used only to complete the circuit, and not to catalyse the dissociation of oxdes) which cover up to 90% of the potentially active sites on the tube, "wooly" electrodes are substituted. As shown in FIG. 3a, the internal electrodes 55a is made in the form of a conducting metal "brush", and external electrode 56a is made in the form of stainless steel or Nichrome wool, or other conductor.

FIGS. 5-8 are graphs showing typical dissociation values, in the reaction zone, which values can change under various run conditions.

In accordance with the invention, a means is provided to:

1. Dissociate oxides of sulfur and nitrogen and separate the resulting oxygen from the system.

2. Remove elemental sulfur from the system.

3. Recover heat used by the process and preheat combustion air (oxygen).

4. Purge oxygen fronm the output (oxygen) of the solid electrolyte. For the purpose of increasing cell efficiency this may be low oxygen flue gas or preheated combustion air.

5. Recover heat from the processed flue gas and increase the heat (temperature) of the feed (SOx - NOx containing) combustion effluent.

6. Provide and eletrolytic cell assembly which acts to remove oxides of sulfur and nitrogen from the combustion vapors.

7. Establish an appropriate electrolytic cell operating temperature.

8. Provide a power source required to transport oxygen ions through the electrolytic cells.

9. Provide a multiplicity of electrodes to cuase efficient electrolytic cell operation.

10. Provide a power source capable of a multiplicity of simultaneous output voltages required to compensate for changes in the ratio of feed and effluent partial pressures.

I claim:

1. In a process for removing oxide contaminants from combustion gas, and employing solid electrolyte reactor means, the steps that include:
   (a) flowing the combustion gas into a zone containing said solid electrolyte means and applying a voltage to said means and at elevated temperature to thereby separate oxygen via said solid electrolyte means,
   (b) removing oxygen from said zone in a first stream and removing hot effluent gas from said zone in a second stream, the effluent gas containing contaminant,
   (c) and pre-heating the combustion gas flowing to said zone by passing it in heat exchange relation with said hot effluent gas.

2. The process of claim 1 wherein said removal of oxygen from said zone includes flowing air or oxygen depleted effluent to said zone to mix with the oxygen and form said first stream.

3. The process of claim 2 including pre-heating said air flowing to said zone to lower the partial pressure of the oxygen at said zone.

4. The process of claim 3 wherein said pre-heating of the air is carried out by passing it in heat exchange relation with said hot effluent gas.

5. The process of claim 3 wherein said pre-heating of the air is carried out by passing it in heat exchange relation with the combustion gas.

6. The process of claim 1 including also further controllably pre-heating the combustion gas flowing to said zone by passing it in heat exchange relation with hot gas from a firebox.

7. The process of claim 1 wherein said contaminant includes $SO_2$ which dissociates in said zone, with S carried from said zone in the effluent second stream, and including removing S from said second stream as the second stream passes in heat exchange relation with the combustion gas flowing to said zone.

8. The process of claim 1 wherein said contaminants include $SO_2$ and $NO_2$, S and $N_2$ forming in said zone, and including removing S from said second stream, $N_2$ being carried in gaseous state in said second stream to discharge to atmosphere.

9. The process of claim 1 including combusting fuel gas and air, and mixing the combustion products thereof with said combustion gas flowing to said zone controlling its temperature.

10. The process of claim 2 including employing said first stream that includes $O_2$ and air in the combustion of fuel that forms said combustion gas.

11. The process of claim 1 wherein said solid electrolyte comprises a zirconia tube having a wall penetrated by oxygen ions dissociated from contaminant ions.

12. In a system for removing oxide contaminants from combustion gas, and employing solid electrolyte reactor means, the combination comprising
   (a) a reaction zone containing said solid electrolyte means to which a voltage is applied, and at elevated temperature,
   (b) means flowing such combustion gas to said zone whereby oxygen is separated from said oxides via said solid electrolyte reactor means and flows from said zone in a first stream, and hot effluent gas flows from said zone in a second stream from which said contaminants have been removed,
   (c) and first heat transfer means receiving said second stream and said combustion gas for transferring heat from said second stream to the combustion gas flowing to said zone.

13. The system of claim 12 including means flowing air to said zone to mix with the oxygen removed from the contaminant, to thereby form said first stream.

14. The system of claim 13 including second heat transfer means for pre-heating said air flowing to said zone to lower the partial pressure of the oxygen at the discharge side of said electrolyte reactor means.

15. The system of claim 14 wherein said second heat transfer means includes a heat exchanger receiving said hot effluent second stream for transfer of heat therefrom to said air flowing to said zone.

16. The system of claim 14 wherein said second heat transfer means includes a heat exchanger receiving hot combustion gas for transfer of heat therefrom to said air flowing to said zone.

17. The system of claim 12 including a heat exchanger receiving hot firebox gas for transfer of heat therefrom to the combustion gas flowing to said zone, and means controlling the flow of hot firebox gas to said exchanger.

18. The system of claim 12 wherein said contaminants include $SO_2$ which dissociates in said zone, with S carried from said zone in the effluent second stream, and including means for removing S from said second stream as the second stream passes in heat exchange relation with the combustion gas flowing to said zone.

19. The system of claim 12 wherein said contaminants include $SO_2$ and $NO_2$, S and $N_2$ forming in said zone, and including means for removing S from said second stream, $N_2$ being carried in gaseous state in said second stream to discharge to atmosphere.

20. The system of claim 12 including means combusting fuel gas and air to form combustion products mixed with said combustion gas flowing to said zone.

21. The system of claim 13 including means passing said first stream that includes $O_2$ and air to a fuel combustion process that forms said combustion gases.

22. The system of claim 12 wherein said solid electrolyte comprising a zirconium tube having a wall penetrated by oxygen ions dissociated from contaminant ions.

23. The system of claim 12 including electrodes applied to said electrolyte means which is tubular and consists of zirconia.

24. The system of claim 23 wherein said electrodes have wool-like form.

25. The system of claim 19 in which said contaminants also include $SO_3$, NO, $NO_3$, $S_2$, $S_4$ and $S_8$.

26. The process of claim 1 herein said contaminant includes $NO_2$, which dissociates in said zone, with $N_2$ carried from said zone in the effluent second stream.

* * * * *